(12) United States Patent
Uphues

(10) Patent No.: US 7,811,057 B2
(45) Date of Patent: Oct. 12, 2010

(54) METHODS AND APPARATUS TO FACILITATE LUBRICATION OF COMPONENTS

(75) Inventor: Ulrich Uphues, Hannover (DE)

(73) Assignee: General Electric Company, Schenectady, NY (US)

( * ) Notice: Subject to any disclaimer, the term of this patent is extended or adjusted under 35 U.S.C. 154(b) by 920 days.

(21) Appl. No.: 11/619,458

(22) Filed: Jan. 3, 2007

(65) Prior Publication Data

US 2008/0159863 A1 Jul. 3, 2008

(51) Int. Cl.
*B64C 11/30* (2006.01)
(52) U.S. Cl. ................................ 416/1; 416/26; 416/30
(58) Field of Classification Search .................. 416/1, 416/26, 27, 30, 155, 156, 157 R, 157 A, 157 B, 416/158
See application file for complete search history.

(56) References Cited

U.S. PATENT DOCUMENTS

| | | | |
|---|---|---|---|
| 4,160,170 A | 7/1979 | Harner et al. | |
| 4,161,658 A | 7/1979 | Patrick | |
| 4,189,648 A | 2/1980 | Harner | |
| 4,193,005 A | 3/1980 | Kos et al. | |
| 4,656,362 A | 4/1987 | Harner et al. | |
| 6,640,933 B2 | 11/2003 | Henry et al. | |
| 6,783,326 B2 * | 8/2004 | Weitkamp et al. | 416/1 |
| 6,991,378 B2 | 1/2006 | Jacquemont et al. | |
| 7,077,630 B2 | 7/2006 | Wobben | |

FOREIGN PATENT DOCUMENTS

JP 63109944 A * 5/1988

* cited by examiner

*Primary Examiner*—Edward Look
*Assistant Examiner*—Dwayne J White
(74) *Attorney, Agent, or Firm*—James McGinness, Esq.; Armstrong Teasdale LLP

(57) ABSTRACT

A method facilitates lubrication of components. The method includes coupling a blade to a pitch control mechanism such that a bearing is positioned between the blade and the pitch control mechanism. The method further includes coupling a control system to the pitch control mechanism and configuring the control system to control the blade pitch mechanism for controlling movement of the blade and rotate the blade from a first position to a second position when a predetermined amount of time has elapsed.

20 Claims, 5 Drawing Sheets

METHODS AND APPARATUS TO FACILITATE LUBRICATION OF COMPONENTS

BACKGROUND OF THE INVENTION

This invention relates generally to lubrication of components, and more specifically to lubrication of a bearing coupled to a blade.

At least some known wind turbines have a bearing coupled between a blade and a hub with a pitch motor positioning the blade attached to the bearing. When the blade remains in the same position for an extended period of time, the bearing required torque will increase as the lubricant in worked out of the bearing raceway through the micro-movements. The more torque the mechanism draws to pitch the blade, the more heat the mechanism generates. In some cases, the heat can delaminate the windings of the mechanism causing mechanism failure. Due to increased friction in the bearing, the bearing could wear and not reach its designed lifetime. In some wind turbines, the blades are up to 60 meters in length, but may be designed to be up to 100 meters, so removal to change a worn bearing can be costly and time consuming. Other known wind turbines are offshore, requiring extensive equipment to remove a blade and replace the bearing. Wind turbines hub heights can be over 120 meters and in high winds, making it dangerous for workers to be on the wind turbines.

A worn bearing can also cause a blade to move out of a pitch setting such that the blades of the wind turbine asymmetrically load the hub and rotor shaft. If the rotor begins to move within the stator due to the asymmetric loading, there is a possibility of the rotor contacting the stator, for example, in direct drive application with the turbine rotor being attached directly to the generator. An electrical transient can occur if the rotor and stator contact, and the wind turbine may then have to be taken off-line.

BRIEF DESCRIPTION OF THE INVENTION

In one aspect a method for lubrication of components is provided. The method includes coupling a blade to a pitch control mechanism such that a bearing is positioned between the blade and the pitch control mechanism. The method further includes coupling a control system to the pitch control mechanism and configuring the control system to control the blade pitch mechanism for controlling movement of the blade and rotate the blade from a first position to a second position when a predetermined amount of time has elapsed.

In another aspect a turbine is provided. The turbine includes a hub, a blade, a blade pitch mechanism configured to move the blade with respect to the hub, a bearing configured to couple the blade to the pitch mechanism, and a control system coupled to the blade pitch mechanism for controlling movement of the blade. The control system configured to rotate the blade from a first position to a second position when a predetermined amount of time has elapsed.

In still another aspect a system for lubrication of components is provided. The system includes a blade coupled to a pitch control mechanism, and a control system coupled to the pitch control mechanism. The control system is configured to control said blade pitch mechanism for controlling movement of said blade, and rotate said blade from a first position to a second position when a predetermined amount of time has elapsed.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of the wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
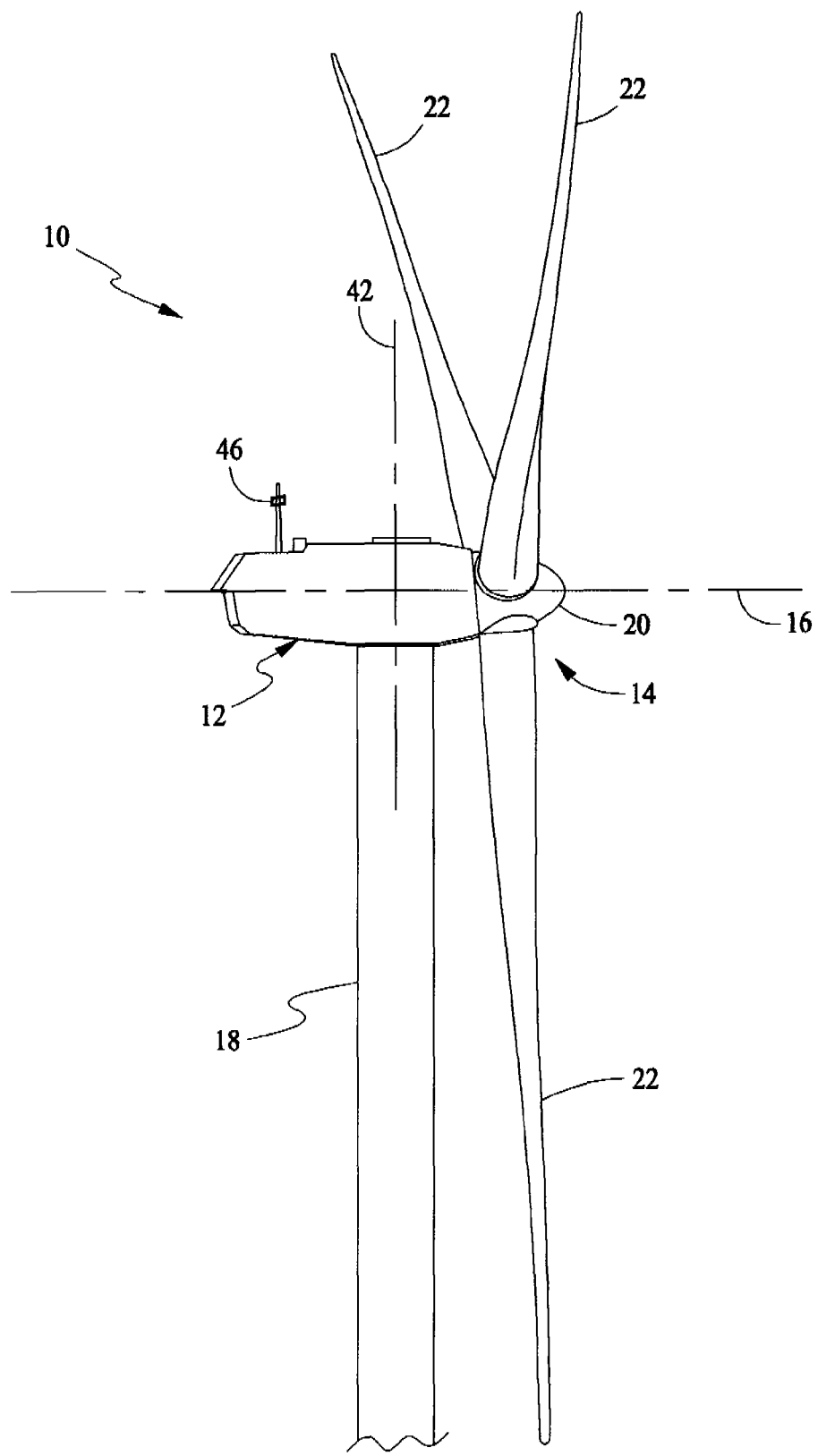
FIG. 1 is a perspective view of an exemplary wind turbine.

FIG. 1 is a perspective view of an exemplary embodiment of an exemplary wind turbine 10. Wind turbine 10 described and illustrated herein is a wind generator for generating electrical power from wind energy. In some known wind turbines, wind turbine 10 is any type of wind turbine, such as, but not limited to, a windmill (not shown). Moreover, wind turbine 10 described and illustrated herein includes a horizontal-axis configuration. In some known wind turbines, wind turbine 10 includes a vertical-axis configuration (not shown). Wind turbine 10 may be coupled to an electrical load (not shown), such as, but not limited to, a power grid (not shown), and may receive electrical power therefrom to drive operation of wind turbine 10 and/or its associated components and/or may supply electrical power generated by wind turbine 10. Although only one wind turbine 10 is shown in FIGS. 1-3, in some embodiments a plurality of wind turbines 10 are grouped together, to form a "wind farm".

Wind turbine 10 includes a body 12, sometimes referred to as a "nacelle", and a rotor (generally designated by 14) coupled to body 12 for rotation with respect to body 12 about an axis of rotation 16. In the exemplary embodiment, nacelle 12 is mounted on a tower 18. The height of tower 18 is any suitable height enabling wind turbine 10 to function as described herein. Rotor 14 includes a hub 20 and a plurality of blades 22 (sometimes referred to as "airfoils") extending radially outwardly from hub 20 for converting wind energy into rotational energy. Although rotor 14 is described and illustrated herein as having three blades 22, rotor 14 may include any number of blades 22.

Figure 2:
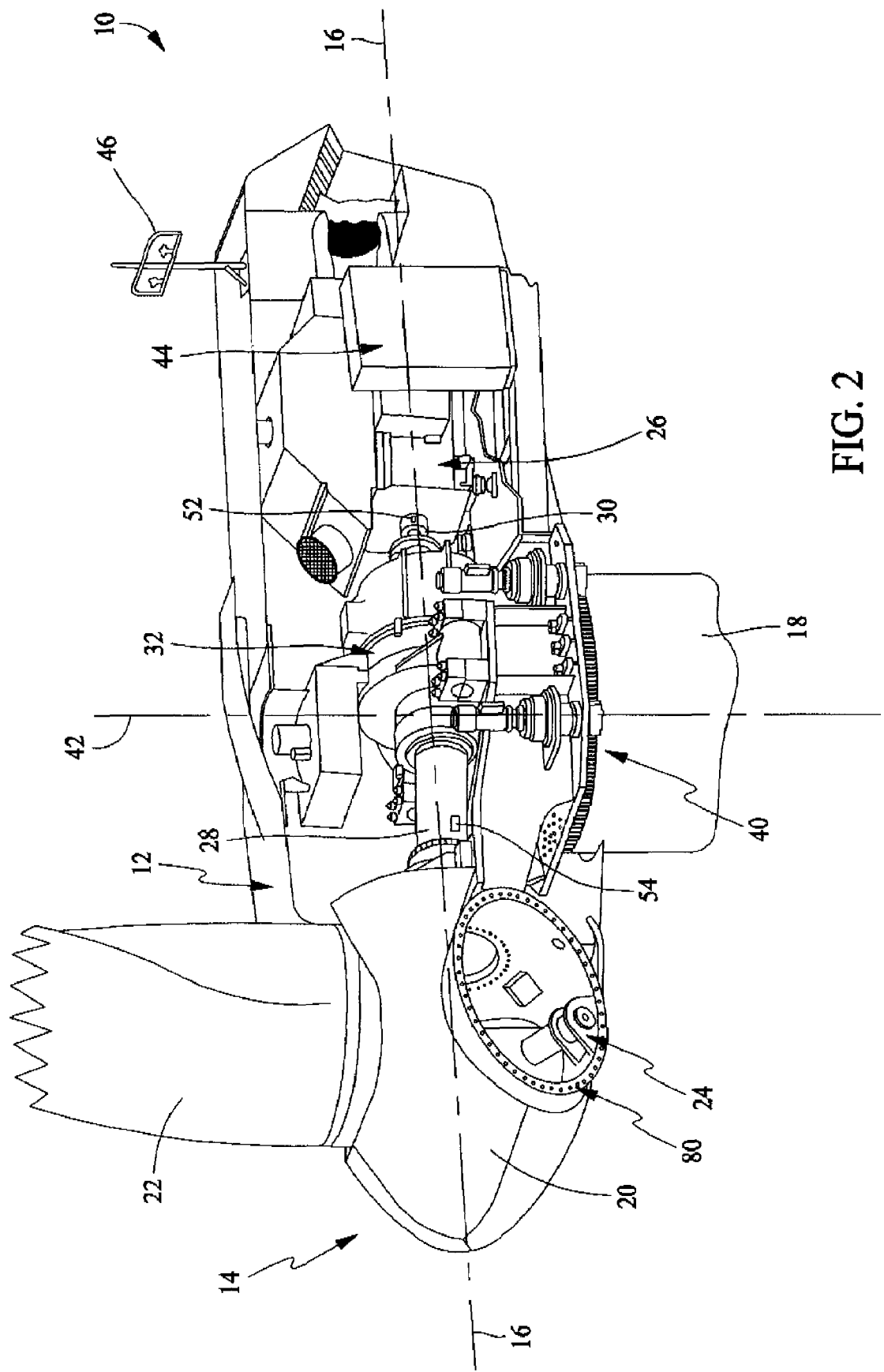
FIG. 2 is a partially cut-away perspective view of a portion of the wind turbine shown in FIG. 1.
Figure 3:
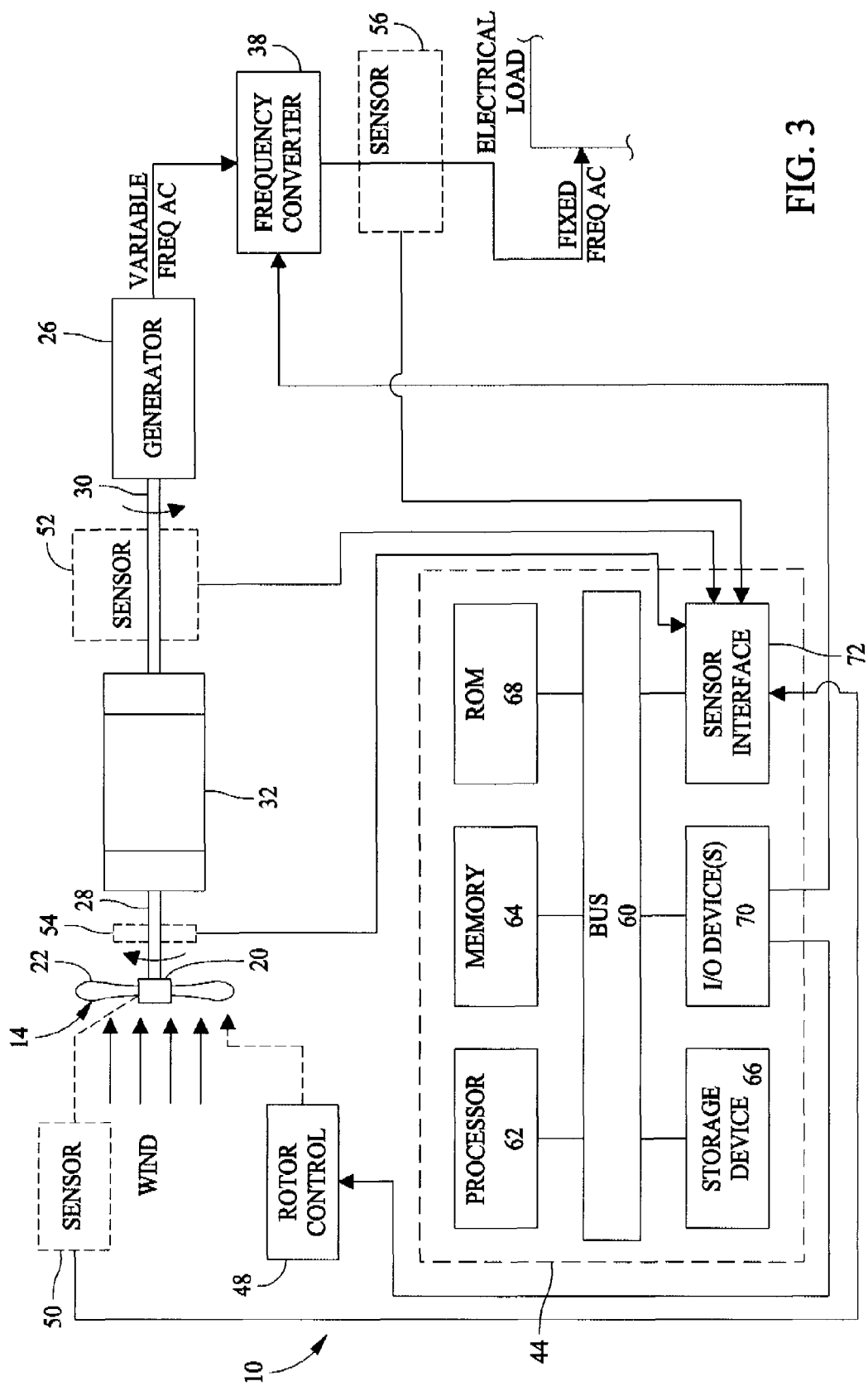
FIG. 3 is a schematic diagram of the wind turbine shown in FIGS. 1 and 2.
Figure 4:
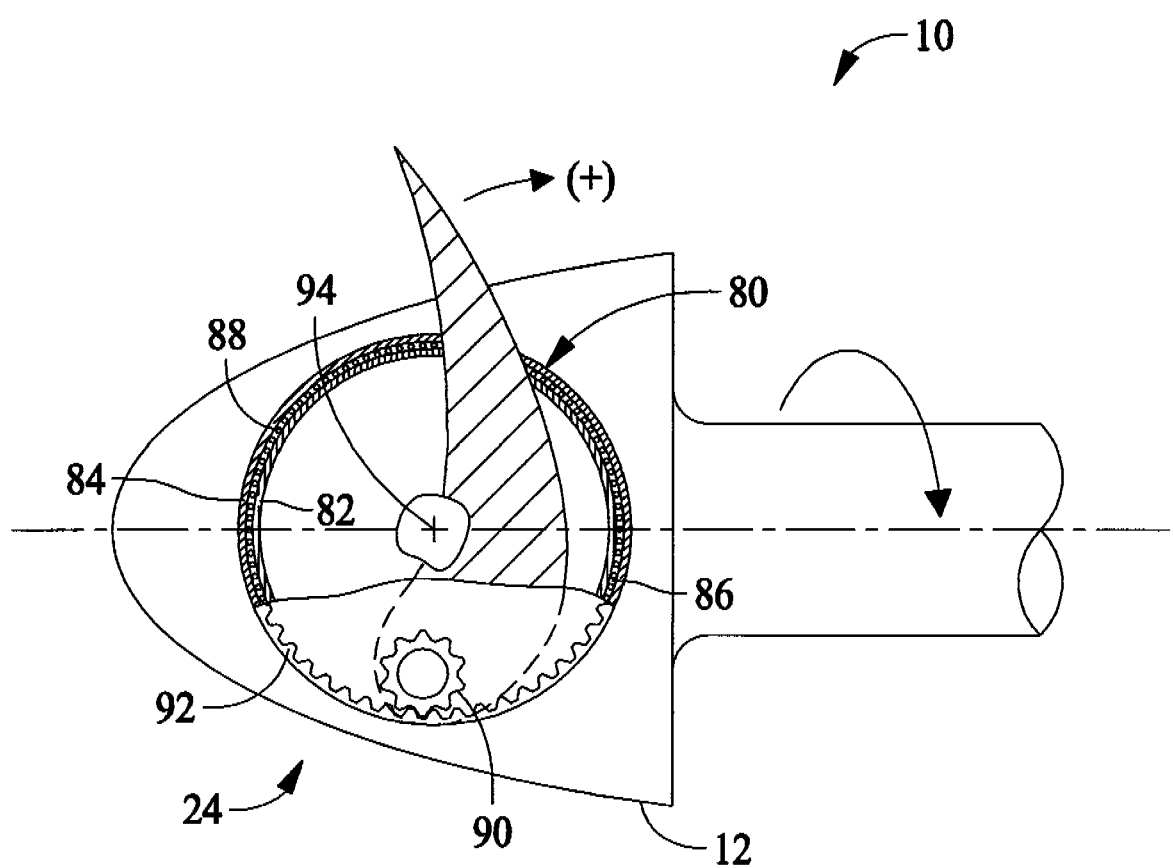
FIG. 4 is a cross-sectional view of a portion of a rotor hub of the wind turbine shown in FIGS. 1-3 illustrating an exemplary embodiment of a pitch system.

FIG. 2 is a partially cut-away perspective view of a portion of an exemplary wind turbine 10. FIG. 3 is a schematic diagram of an exemplary wind turbine 10. FIG. 4 is a cross-sectional view of a portion of hub 20 illustrating an exemplary embodiment of a pitch system 24. Wind turbine 10 includes an electrical generator 26 coupled to rotor 14 for generating electrical power from the rotational energy generated by rotor 14. Generator 26 is any suitable type of electrical generator, such as, but not limited to, a wound rotor induction generator. Rotor 14 includes a rotor shaft 28 coupled to rotor hub 20 for rotation therewith. Generator 26 is coupled to rotor shaft 28 such that rotation of rotor shaft 28 drives rotation of the generator rotor, and therefore operation of generator 26. In the exemplary embodiment, the generator rotor has a rotor shaft 30 coupled thereto and coupled to rotor shaft 28 such that rotation of rotor shaft 28 drives rotation of the generator rotor. In the exemplary embodiment, generator rotor shaft 30 is coupled to rotor shaft 28 through a gearbox 32, although in other embodiments generator rotor shaft 30 is coupled directly to rotor shaft 28. The rotation of rotor 14 drives the generator rotor to thereby generate variable frequency AC electrical power from rotation of rotor 14. A frequency converter 38 is coupled to generator 26 for converting the variable frequency AC to a fixed frequency AC for delivery to an electrical load (not shown).

In some embodiments, wind turbine 10 includes a brake system (not shown) for braking rotation of rotor 14. Furthermore, in some embodiments, wind turbine 10 includes a yaw system 40 for rotating nacelle 12 about an axis of rotation 42 to change a yaw of rotor 14. Yaw system 40 is coupled to and controlled by a control system(s) 44, described in more detail below. In some embodiments, wind turbine 10 includes an anemometry 46 for measuring wind speed and/or wind direction. Anemometry 46 is coupled to control system(s) 44 for sending measurements to control system(s) 44 for processing thereof.

In some embodiments, wind turbine 10 includes one or more control systems 44 coupled to components of wind turbine 10 for generally controlling operation of wind turbine 10 and/or components thereof. In the exemplary embodiment, control system(s) 44 are coupled to a rotor control 48 for generally controlling rotor 14. In the exemplary embodiment, control system(s) 44 is mounted within nacelle 12. Alternatively, one or more control systems 44 may be remote from nacelle 12 and/or other components of wind turbine 10. Control system(s) 44 may be used for, but is not limited to, overall system monitoring and control including, for example, pitch and speed regulation, high-speed shaft and yaw brake application, yaw and pump motor application, and/or fault monitoring. Alternative distributed or centralized control architectures may be used in some embodiments.

In the exemplary embodiment, wind turbine 10 also includes a plurality of sensors 50, each coupled to a corresponding blade 22. Sensors 50 are any suitable sensor having any suitable location within or remote to wind turbine 10, such as, but not limited to, optical encoders within pitch system 24, described in more detail below. In some embodiments, sensors 50 are coupled to control system(s) 44 for sending pitch measurements to control system(s) 44 for processing thereof. In the exemplary embodiment, wind turbine 10 includes one or more sensors 52 coupled to generator rotor shaft 30 for measuring a speed of rotation of rotor shaft 30 and/or a torque of generator rotor shaft 30. Sensor(s) 52 are any suitable sensor having any suitable location within or remote to wind turbine 10, such as, but not limited to, optical encoders, digital proximity sensors, strain gages, and/or tachometers. In some embodiments, sensor(s) 52 are coupled to control system(s) 44 for sending speed measurements to control system(s) 44 for processing thereof. Moreover, in the exemplary embodiment, wind turbine 10 includes one or more sensors 54 coupled to rotor shaft 28 for measuring a speed of rotation of rotor shaft 28 and/or a torque of rotor shaft 28. Sensor(s) 54 are any suitable sensor having any suitable location within or remote to wind turbine 10, such as, but not limited to, optical encoders, digital proximity sensors, piezo-electric transducers, strain gages, and/or tachometers. In some embodiments, sensor(s) 54 are coupled to control system(s) 44 for sending measurements to control system(s) 44 for processing thereof. Furthermore, in the exemplary embodiment, wind turbine 10 includes one or more sensors 56 coupled to generator 26 for measuring an electrical power output of generator 26. In some embodiments, sensor(s) 56 are coupled to control system(s) 44 for sending measurements to control system(s) 44 for processing thereof. Sensor(s) 56 are any suitable sensor having any suitable location within or remote to wind turbine 10, such as, but not limited to, Hall effect current transducers (CTs) and/or capacitive voltage transducers (CVTs).

In other embodiments, wind turbine 10 also includes one or more other sensors (not shown) coupled to one or more components of wind turbine 10 and/or the electrical load. Such other sensor(s) include, but are not limited to, sensors configured to measure displacements, yaw, pitch, moments, strain, stress, twist, damage, failure, rotor torque, rotor speed, an anomaly in the electrical load, and/or an anomaly of power supplied to any component of wind turbine 10. Such other sensors couple to any component of wind turbine 10 and/or the electrical load at any location thereof for measuring any parameter thereof.

In some embodiments, control system(s) 40 include a bus 60 or other communications device to communicate information. One or more processor(s) 62 are coupled to bus 60 to process information, including information from anemometry 46, sensors 50, 52, 54, and/or 56, and/or other sensor(s). Control system(s) 44 also include one or more random access memories (RAM) 64 and/or other storage device(s) 66. RAM(s) 64 and storage device(s) 66 are coupled to bus 60 to store and transfer information and instructions to be executed by processor(s) 62. RAM(s) 64 (and/or also storage device(s) 66, if included) is also used to store temporary variables or other intermediate information during execution of instructions by processor(s) 62. Control system(s) 44 also include one or more read only memories (ROM) 68 and/or other static storage devices coupled to bus 60 to store and provide static (i.e., non-changing) information and instructions to processor(s) 62. Input/output device(s) 70 includes any device known in the art to provide input data to control system(s) 44 and/or to provide outputs, such as, but not limited to, yaw control and/or pitch control outputs. Instructions are provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry is used in place of or in combination with software instructions such that execution of sequences of instructions is not limited to any specific combination of hardware circuitry and software instructions. Control system(s) 44 also include a sensor interface 72 that allows control system(s) 44 to communicate with anemometry 46, sensors 50, 52, 54, and/or 56, and/or other sensor(s). Sensor interface 72 can be or can include, for example, one or more analog-to-digital converters that convert analog signals into digital signals that can be used by processor(s) 62.

Wind turbine 10 includes a variable blade pitch system 24 for controlling a pitch angle of rotor blades 22 with respect to a wind direction. Pitch system 24 is coupled to control system(s) 44 for control thereby. Blade 22 and pitch system 24 are coupled to bearing 80 housed in hub 20. Bearing 80 has an inner race 82 and a concentric outer race 84. Inner race 82 is coupled to blade 22 and outer race 84 is coupled to pitch system 24. An annular groove 86 is defined between inner race 82 and outer race 84 and includes at least one material 88 which reduces friction when inner race 82 and outer race 84 move with respect to each other. Material 88 is at least one of balls (not shown) or a lubricant (not shown). Alternatively, blade 22 is coupled to outer race 84, and inner race 82 is coupled to hub 20 wherein pitch system 24 drives outer race 84 to control the position of blade 22.

In some embodiments, pitch system 24 includes one or more actuators. The pitch actuators include any suitable structure, configuration, arrangement, means, and/or components, such as, but not limited to, electrical motors, hydraulic cylinders, springs, and/or servomechansims. Moreover, the pitch actuators are driven by any suitable means, such as, but not limited to, hydraulic fluid, electrical power, electrochemical power, and/or mechanical power, such as, but not limited to, spring force. In some embodiments, the pitch actuators are driven by energy extracted from at least one of a rotational inertia of rotor 14 and a stored energy source (not shown) that supplies energy to components of wind turbine 10. In the exemplary embodiment, pitch system 24 includes a pitch drive gear 90 and a pitch ring gear 92 coupled to hub 20 and blades 22 via bearing 80. Pitch system 24 utilizes actuators for changing the pitch angle of blades 22 by rotating blades 22 coupled to inner race 82 with respect to hub 20 and outer race 84. More specifically, in the exemplary embodiment, the pitch actuators include a pitch drive gear 90 that is coupled to a pitch ring gear 92. Pitch ring gear 92 is coupled to blade 22 such that rotation of pitch drive gear 90 rotates blade 22 about an axis of rotation 94 to thereby change the pitch of blade 22.

Figure 5:
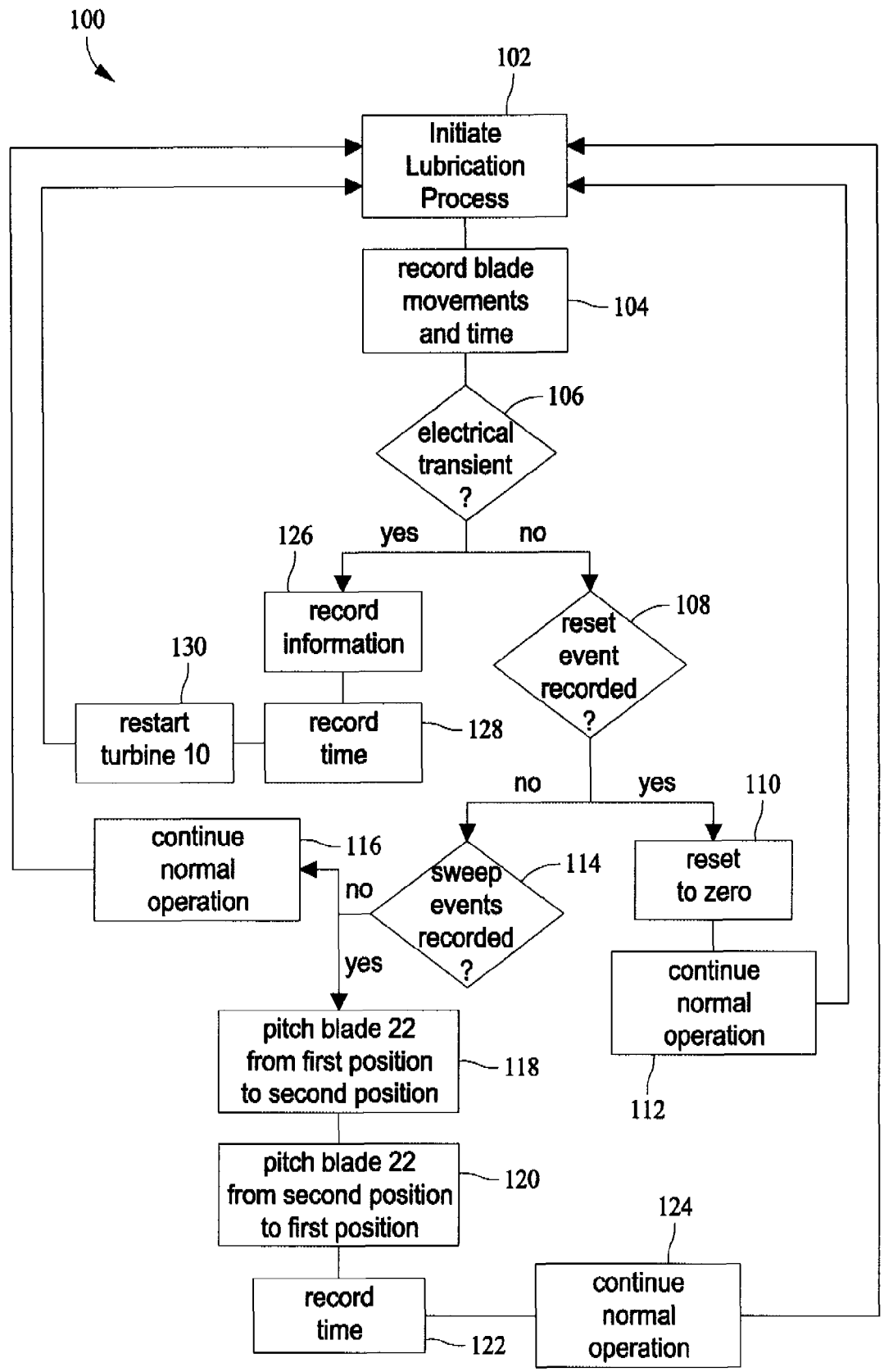
FIG. 5 is a flowchart illustrating an exemplary embodiment of a method for lubricating components.

FIG. 5 is a flowchart illustrating an exemplary embodiment of a method 100 for lubricating components. More specifically, method 100 lubricates bearing 80 coupled to blade pitch system 24 and blade 22 of a wind turbine, such as, but not limited to, wind turbine 10. Although method 100 will be described and illustrated herein with respect to wind turbine 10, method 100 is applicable to any bearing component controlled with a control system, such as, but not limited to, control system 44. In the exemplary embodiment, while control system 44 is in operation, control system 44 records at least one of a time, an electrical transient, and a blade 22 movement on a counter (not shown) within control system 44 to determine whether the pitch angle of blade 22 should be altered to ensure proper lubrication of bearing 80.

In the exemplary embodiment, control system 44 initiates running 102 the lubrication process. Control system 44 records 104 movements of blade 22 with respect to time. More specifically, in the exemplary embodiment, control system 44 records at least one of an instantaneous time of blade movement and an elapsed time between blade movements. Control system 44 also records 104 a measurement of the change of the pitch angle of blade 22 each time blade 22 is moved. While control system 44 records 104 a time and angle of a blade movement, control system also determines 106 whether an electrical transient has occurred, as described in more detail below. As long as control system 44 determines 106 that no electrical transient has occurred, control system 44 continues to record 104 time of blade movements. In the exemplary embodiment, control system 44 also determines 108 whether blade movement has occurred within a predetermined pitch angle within a predetermined time.

In the exemplary embodiment, control system 44 determines 108 whether a reset event has occurred. In the exemplary embodiment, a reset event occurs when blade 22 has been pitched within a predetermined angle range over a predetermined time by analyzing time and angle changes recorded in step 104. More specifically, in an exemplary embodiment, the predetermined angle range is ten to twenty degrees and the predetermined time is ten minutes. The predetermined angle range and predetermined time are set based on the range of blade movement needed within a certain time period to evenly lubricate bearing 80. If control system 44 determines 108 that the reset event occurred, control system 44 is reset 110 to zero such that control system 44 restarts a measurement of an elapsed time between blade movements. The elapsed time measurement is a measurement of the amount of time that has elapsed between movements of blade 22. After control system 44 is reset 110 to zero, control system 44 continues 112 pitching blade 22 as required during normal operation of wind turbine 10, and control system 44 continues running 102 the lubrication process.

If control system 44 has determined 108 that the reset event has not occurred, control system 44 determines 114 if a sweep event occurred. In the exemplary embodiment, a sweep event occurs when a predetermined elapsed time has been reached by control system 44. In the exemplary embodiment, the predetermined elapsed time is measured as the time that has elapsed between blade movements. More specifically, in an exemplary embodiment, the predetermined elapsed time is three hours between blade movements. The predetermined elapsed time is set to facilitate ensuring that blade 22 moves often enough to facilitate evenly distributing material 88 in bearing 80. If control system 44 has determined 114 that the sweep event has not occurred, control system 44 continues 116 pitching blade 22 as required during normal operation of wind turbine 10, and control system 44 continues running 102 the lubrication process. If control system 44 determines 114 that the sweep event has occurred, control system 44 performs a pitch sweep that includes pitching 118 blade 22 from a first position to a second position. The pitch sweep also includes control system 44 then pitching 120 blade 22 such that blade 22 is returned to the first position. In an exemplary embodiment, the first position is the position of blade 22 when control system 44 determines that the sweep event has occurred and the second position is ten to twenty degrees from the first position. More specifically, the second position is determined to facilitate ensuring blade 22 moves enough to substantially lubricate bearing 80 without taking wind turbine 10 off-line and losing more power generation than necessary. In the exemplary embodiment, control system 44 records 122 the time when the pitch sweep was performed. Control system 44 continues 124 pitching blade 22 as required during normal wind turbine 10 operation. Control system 44 continues running 102 the lubrication process.

If control system 44 determines 106 an electrical transient has occurred, control system 44 records 126 electrical transient information. In the exemplary embodiment, the electrical transient information includes the time of the electrical transient. In an exemplary embodiment, control system 44 records 128 the time that has elapsed between the time of the last pitch sweep and the time of the electrical transient. Other electrical transient information can be, but is not limited to, the time that has elapsed between the time of the electrical transient and the time of the occurrence of the reset event, and/or the time that has elapsed between the time of the electrical transient and the time of the occurrence of a previous electrical transient In an exemplary embodiment, control system determines 106 whether an electrical transient has occurred based on data received from sensor, such as, but not limited to, sensors 50, 52, 54, and/or 56, and/or other sensors, as described above. After control system 44 records 126 and 128 electrical transient information, control system 44 restarts 130 wind turbine 10 and continues running 102 lubrication process.

When lubrication process is run 102 over an in-service life of wind turbine 10, bearing 80 is facilitated to be properly lubricated by pitching blade 22 coupled to bearing 80. Pitching blade 22 facilitates even distribution of at least one material 88, such as a lubricant, within bearing annular groove 86. Control system 44 records 104 blade pitch angles and time to determine whether blade 22 is being pitched frequently enough to ensure material 88 is substantially evenly dispersed within bearing 80. The reset event does not occur when blade 22 has been pitched within the pitch angle range but not within the predetermined time because material 88 in bearing 80 has not been moved continuously enough within bearing 80 to properly lubricate of bearing 80. The predetermined elapsed time of step 114 facilitates preventing deformation of bearing 80 without reducing power and 120 generation of wind turbine 10 more than necessary. By limiting pitch sweep to pitching 118 blade 22 from a first position to a second position and then pitching 120 blade 22 back to the first position, wind turbine 10 is facilitated to be maintained online to preserve power generation. Control system 44 records 126 and 128 electrical transients to determine if predetermined time, pitch angle range, and predetermined time elapse parameters should be adjusted.

The above-described method and apparatus to facilitate lubrication of components facilitates reducing deformation of bearings and reducing torque required by the blade pitch system to pitch a blade. Proper lubrication of the bearing facilitates preventing deformation of the bearing. The exemplary embodiment is a cost-effective way to properly lubricate a bearing in a wind turbine. More specifically, the limited pitch from the first position to the second position preserves power generation of the wind turbine. Further, a non-deformed, properly lubricated bearing facilitates reducing the torque required by the blade pitch system to pitch the blade. A lower torque facilitates averting a temperature increase in the windings of the blade pitch systems and avoiding delamination of the windings. Furthermore, the exemplary embodiment of lubrication facilitates preventing the bearing and/or blade pitch system from being replaced, which maintains power generation of the wind turbine and reduces the need for dangerous and expensive maintenance work on the turbine. Moreover, asymmetric loading on the rotor shaft of the wind turbine is facilitated to be reduced when the bearing is not deformed. When the rotor shaft is symmetrically loaded, the possibility of an electrical transient is reduced.

Exemplary embodiments of a method and apparatus to facilitate increasing turbine rotor efficiency are described above in detail. The apparatus is not limited to the specific embodiments described herein, but rather, components of the method and apparatus may be utilized independently and separately from other components described herein. For example, the lubrication process may also be used with other control systems for controlling bearings, and is not limited to practice with only wind turbine blade assemblies as described herein. Rather, the present invention can be implemented and utilized in connection with many other bearing lubrication applications.

While the invention has been described in terms of various specific embodiments, those skilled in the art will recognize that the invention can be practiced with modification within the spirit and scope of the claims.

What is claimed is:

1. A method for lubricating components, said method comprising:
    coupling a blade to a pitch control mechanism such that a bearing is positioned between the blade and a hub;
    coupling a control system to the pitch control mechanism; and
    configuring the control system to:
    control the pitch control mechanism for controlling a movement of the blade; and
    rotate the blade from a first position to a second position when the control system determines that a predetermined amount of time has elapsed without an occurrence of a reset event.

2. A method in accordance with claim 1 wherein configuring the control system to rotate the blade from a first position to a second position comprises determining the first position and the second position such that a ball within the bearing rotates through at least one rotation.

3. A method in accordance with claim 1 further comprising resetting the control system when the blade is moved within a predetermined pitch angle range within a predetermined time.

4. A method in accordance with claim 3 wherein resetting the control system comprises setting the predetermined pitch angle range between ten and twenty degrees from the first position.

5. A method in accordance with claim 1 wherein configuring the control system comprises configuring the control system to record a pitch sweep dataset including at least one of a lapse of time between movements of the blade, a pitch angle change of the blade, and a pitch angle change of the blade with respect to time.

6. A method in accordance with claim 1 wherein configuring the control system comprises configuring the control system to record an electrical transient dataset including at least one of an accumulated time and an instantaneous time.

7. A method in accordance with claim 1 wherein coupling a blade to a pitch control mechanism comprises receiving a lubrication medium within the bearing.

8. A turbine comprising:
    a hub;
    a blade;
    a blade pitch mechanism configured to move said blade with respect to said hub;
    a bearing configured to couple said blade to said blade pitch mechanism; and
    a control system coupled to said blade pitch mechanism for controlling a movement of said blade, said control system configured to rotate said blade from a first position to a second position when said control system determines that a predetermined amount of time has elapsed without an occurrence of a reset event.

9. A turbine in accordance with claim 8 wherein said control system is reset when said blade is moved within a predetermined pitch angle range within a predetermined time.

10. A turbine in accordance with claim 8 wherein said control system is configured to record a pitch sweep dataset including at least one of a lapse of time between movements of said blade, a pitch angle change of said blade, and a pitch angle change of said blade with respect to time.

11. A turbine in accordance with claim 8 wherein said control system comprises a counter configured to record an electrical transient dataset, said electrical transient dataset including at least one of an accumulated counter number and an instantaneous counter number.

12. A turbine in accordance with claim 8 wherein said bearing comprises a lubrication medium within said bearing.

13. A turbine in accordance with claim 8 wherein said control system is further configured with values for the first position and the second position such that a ball within said bearing rotates through at least one rotation.

14. A system for lubricating components, said system comprising:
 a blade coupled to a pitch control mechanism; and
 a control system coupled to said pitch control mechanism, said control system configured to:
 control said pitch control mechanism for controlling a movement of said blade; and
 rotate said blade from a first position to a second position when said control system determines that a predetermined amount of time has elapsed without an occurrence of a reset event.

15. A system in accordance with claim 14 wherein said control system is reset when said blade is moved within a predetermined pitch angle range within a predetermined time.

16. A system in accordance with claim 15 further comprising a bearing and a ball within said bearing, wherein said control system is configured to rotate said blade from a first position to a second position by setting the first position and the second position such that said ball rotates through at least one rotation.

17. A system in accordance with claim 15 wherein the predetermined pitch angle range is between ten and twenty degrees from the first position.

18. A system in accordance with claim 14 wherein said control system is configured to record a pitch sweep dataset including at least one of a lapse of time between movements of said blade, a pitch angle change of said blade, and a pitch angle change of said blade with respect to time.

19. A system in accordance with claim 14 wherein said control system is configured to record an electrical transient dataset including at least one of an accumulated time and an instantaneous time.

20. A system in accordance with claim 14 further comprising a bearing and a lubrication medium within said bearing.

* * * * *